(12) United States Patent
Cousineau

(10) Patent No.: US 6,850,664 B2
(45) Date of Patent: Feb. 1, 2005

(54) FIBER OPTIC CONVERTERS FOR INCREMENTAL SHAFT ENCODERS

(75) Inventor: Kevin Lewis Cousineau, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 10/017,127

(22) Filed: Dec. 14, 2001

(65) Prior Publication Data

US 2003/0113061 A1 Jun. 19, 2003

(51) Int. Cl.$^7$ .................................................. G02B 6/26
(52) U.S. Cl. ............................. 385/25; 385/31; 341/11; 250/231.14
(58) Field of Search ............................. 385/25, 26, 31; 341/11; 250/231.13–14

(56) References Cited

U.S. PATENT DOCUMENTS

| | | | | | |
|---|---|---|---|---|---|
| 4,218,615 A | * | 8/1980 | Zinn, Jr. | ................ | 250/231.16 |
| 4,475,086 A | * | 10/1984 | Allen | ......................... | 327/38 |
| 5,594,241 A | * | 1/1997 | Li et al. | ................ | 250/231.17 |
| 6,191,415 B1 | * | 2/2001 | Stridsberg | .............. | 250/231.13 |

\* cited by examiner

*Primary Examiner*—Rodney Bovernick
*Assistant Examiner*—Sung Pak
(74) *Attorney, Agent, or Firm*—Blakely, Sokoloff, Taylor & Zafman LLP

(57) ABSTRACT

A method for providing robust and reliable transmission of shaft encoder signals. Initially, the differentially encoded shaft encoder signals are received. The shaft encoder signals are converted into single-ended electrical signals. These single-ended electrical signals are then converted into optical signals. Finally, the optical signals are transmitted through optical conductors.

15 Claims, 4 Drawing Sheets

FIBER OPTIC CONVERTERS FOR INCREMENTAL SHAFT ENCODERS

BACKGROUND

1. Field of the Invention

The present invention relates to a shaft encoder. More particularly, the invention relates to a fiber optic converter for such a shaft encoder.

2. Prior Art

Shaft encoders are electromechanical devices which provide electronic representations of the variable properties of a rotating shaft. By properly coupling the input shaft of the encoder, and operating the encoder in conjunction with suitable electronics, the output from the encoder may be made to represent angular or linear position, speed of rotation, direction of rotation, and amount of rotation. Moreover, incremental shaft encoders may provide high-level and/or low-level logic outputs having both single-ended and differential (i.e., complementary pair) signals. A standard connection between an incremental encoder and a shaft control system may be completed using six wires for the three signals (using differential signaling), and another pair of wires for the power supply. However, the problem with these encoders is that in many applications the signal wires are often bundled or cabled along with AC power cables, high-frequency signal cables, and/or other cables that contain high levels of electromagnetic fields. These fields may generate interferences with the encoder signals. Moreover, the encoder signals, if carried for distances exceeding several meters, are susceptible to interference from lightning induced voltages.

To alleviate the problems associated with Electro Magnetic Interference (EMI), differential signaling may be used where two logic signals are separated by 180 degrees in phase. However, even with differential signaling, other problems arise due to the non-isolated nature of these signals, including ground bounce, overshoot, ringing, and ground loops, each generating a unique noise signature and interference signature. Furthermore, the encoder signal may not be completely immune from electromagnetic interferences, especially when the line length becomes longer than a few feet and when these events are generated by lightning.

SUMMARY

The present invention, in one aspect, describes a fiber optic shaft encoder system. The system includes a rotating shaft having shaft movement parameters, an incremental shaft encoder, first and second optical converters, and a plurality of optical conductors. The incremental shaft encoder converts the shaft movement parameters of the rotating shaft into differentially encoded electrical signals suitable for processing. The first optical converter converts the differentially encoded electrical signals into optical signals. The optical conductors carry the optical signals. The second optical converter receives and converts the optical signals back into electrical signals.

In another aspect, the present invention describes a method for providing robust and reliable transmission of shaft encoder signals. Initially, the differentially encoded shaft encoder signals are received. The shaft encoder signals are converted into single-ended electrical signals. These single-ended electrical signals are then converted into optical signals. Finally, the optical signals are transmitted through optical conductors.

DETAILED DESCRIPTION

In recognition of the above-stated problems associated with prior art designs of shaft encoder systems, the present invention describes embodiments for a fiber optic shaft encoder system. Specifically, the electrical encoder signals are converted into optical signals before being transmitted to the shaft control system. This substantially reduces interference from electromagnetic and/or electrical sources. Consequently, for purposes of illustration and not for purposes of limitation, the exemplary embodiments of the invention are described in a manner consistent with such use, though clearly the invention is not so limited.

Figure 1:
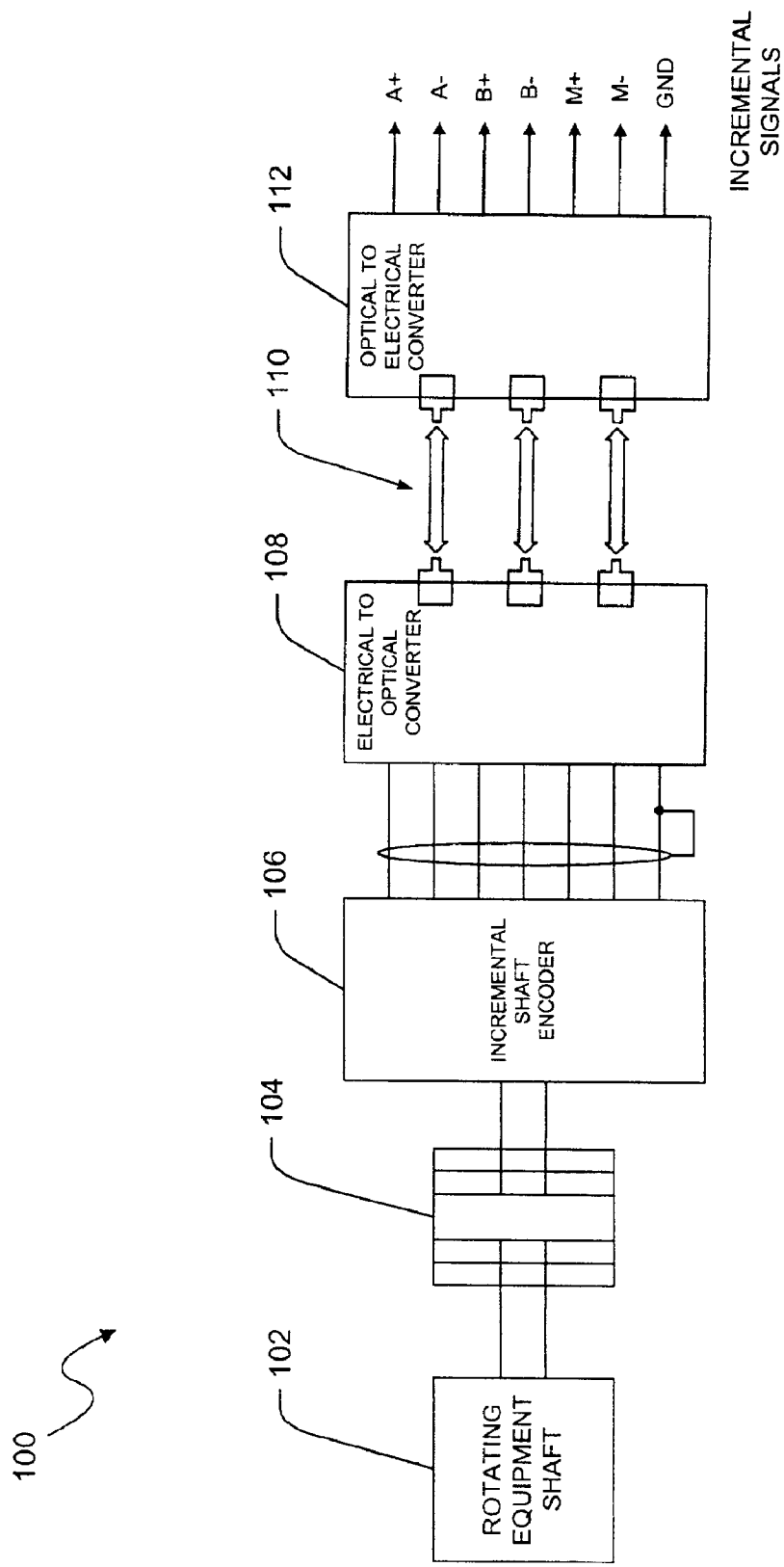
FIG. 1 is a block diagram of an incremental shaft encoder system, including fiber optic converters, according to an embodiment of the present invention.

A block diagram of an incremental shaft encoder system 100, including fiber optic converters 108, 112, according to an embodiment of the present invention, is shown in FIG. 1. The encoder system 100 includes a shaft coupler 104, an incremental shaft encoder 106, an electrical-to-optical converter 108, optical conductors 110, and an optical-to-electrical converter 112.

The shaft coupler 104 detects and converts movement parameters of the rotating equipment shaft 102 into electrical signals at the input of the incremental shaft encoder 106. The incremental encoder 106 then converts the shaft parameters into differentially encoded (i.e., complementary pair) signals suitable for processing. Furthermore, the incremental encoder 106 provides the differentially encoded data to the electrical-to-optical converter 108. The connection between the incremental encoder 106 and the converter 108 is accomplished using standard shielded copper wire as shown. Since the size and complexity of the converter 108 is relatively small, the connection between the encoder 106 and the converter 108 may be kept short. This may prevent any undue interference and assure proper termination.

The output of the electrical-to-optical converter 108 includes three optical signals, signal A, signal B, and a marker pulse (M). Specifically, signals A and B are shaft-monitoring signals that are out of phase (e.g., 90 degrees out of phase) to indicate the direction of the shaft 102. The marker pulse (M), which may output one pulse per revolution of the shaft 102, indicates the amount of rotation of the shaft 102. The optical conductors 110 may then carry these optical signals over a relatively long distance, such as hundreds or thousands of meters. In some embodiments, the optical conductors 110 are fiber optic cables. The optical-to-electrical converter 112 converts the optical signals into electrical signals with the same signal level as those generated by the incremental shaft encoder 106.

Figure 2:
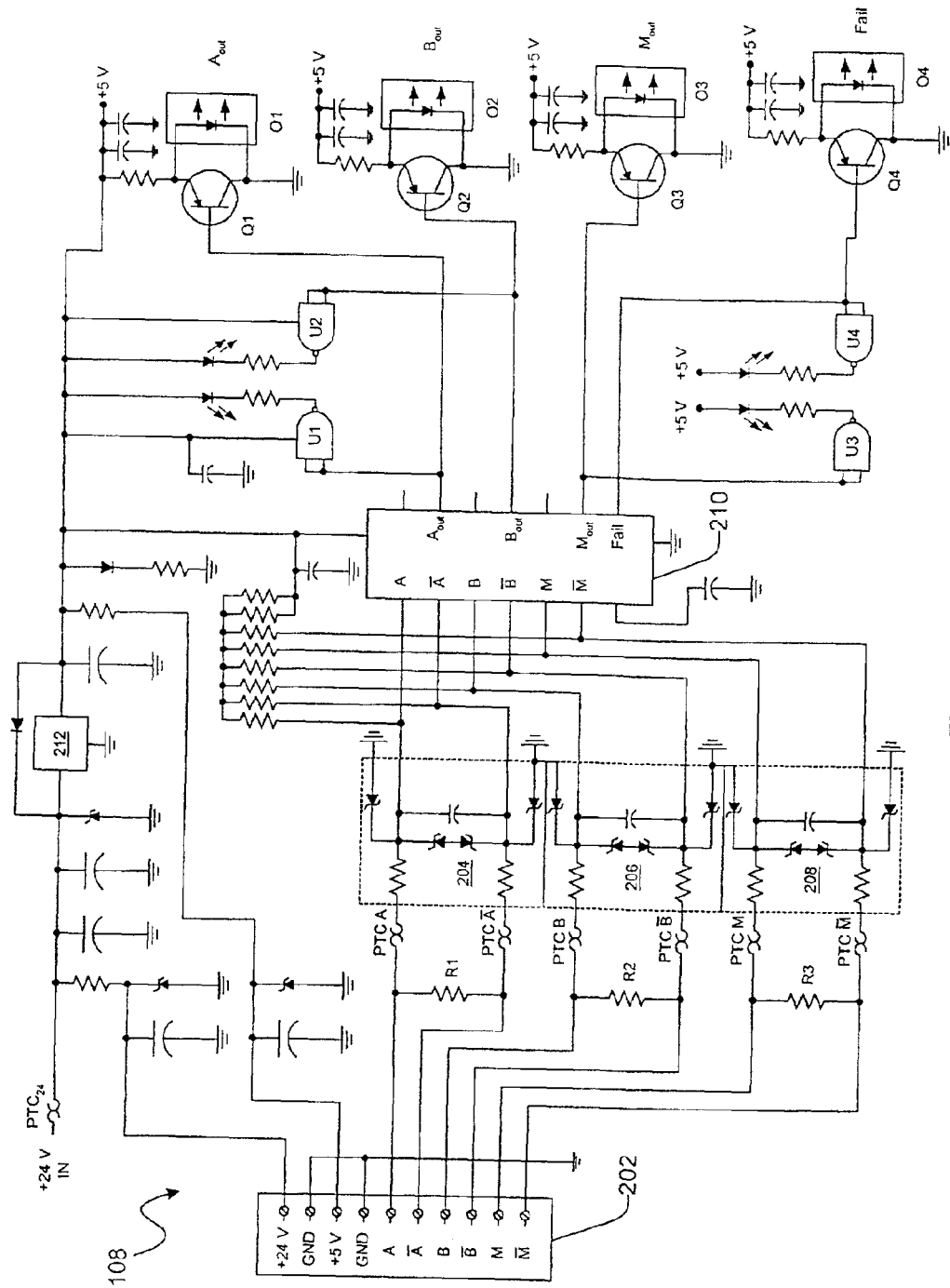
FIG. 2 illustrates a schematic diagram of an electrical-to-optical converter according to an embodiment of the present invention.

FIG. 2 illustrates a schematic diagram of the electrical-to-optical converter 108 according to an embodiment of the present invention. The converter 108 receives the differentially encoded signals A, B, and M, along with their complementary pair signals $\overline{A}$, $\overline{B}$, and $\overline{M}$, at a connector 202. Each complementary pair of differentially encoded signals is terminated with a termination resistor R1, R2, or R3. The Positive Temperature Coefficient (PTC) thermistors, along with four Zener diodes, form a transient over-voltage protection package for the differential signal prior to its introduction to the input of the integrated circuit 210. The remaining resistors in series with the Zener diodes complete a current-limiting circuit that reduces higher voltage drive signals from the shaft encoder to the lower voltage input of the signal converter 210.

In this embodiment, the shaft encoder outputs a 24-volt logic level signal while the integrated circuit at 210 requires a 5-volt logic level signal. The combination of the series resistors in each signal line, along with the Zener diodes for a voltage-level shifter, provides the required 5-volt logic level signal. A small amount of capacitance is shown between each of the input lines. This capacitor along with the series resistors on each of the signal line inputs form a simple single pole filter to assure that only signals of the proper frequency range appear at the input of signal converter 210.

In the illustrated embodiment, a signal converter 210 then converts the differently encoded signals A/$\overline{A}$, B/$\overline{B}$, and M/$\overline{M}$ into single-ended signals $A_{out}$, $B_{out}$ and $M_{out}$, respectively. The supply voltage for the converter 210 is generated by down converting the +24 volt input supply. The +24 volt supply is current limited, filtered, and regulated by a thermistor $PTC_{24}$, resistors, capacitors, diodes, and a step-down voltage converter 212. Thus, in the illustrated embodiment, the output of the step-down converter 212 provides a regulated +5 volt supply for the signal converter 210. Moreover, output voltages of the signal converter 210 are allowed to swing between the ground voltage level and +5 volts through NAND gates U1 through U4. The signal converter 210 also outputs a fail or fault output which indicates signal failure.

The single-ended encoder outputs, $A_{out}$, $B_{out}$, and $M_{out}$, along with the fail/fault output, are converted into optical signals for transmission through the optical conductors 110. The conversion is provided by triggering the base terminals of transistors Q1 through Q4, which in turn, drive the optical couplers O1 through O4, respectively. Accordingly, the electrical-to-optical converter 108 described above enables transmission of shaft encoder signals over longer distances than the traditional method of transmitting the signal over electrical wires. Further, the converter 108 substantially reduces interference to the encoder signals from electromagnetic and/or electrical sources.

Figure 3:
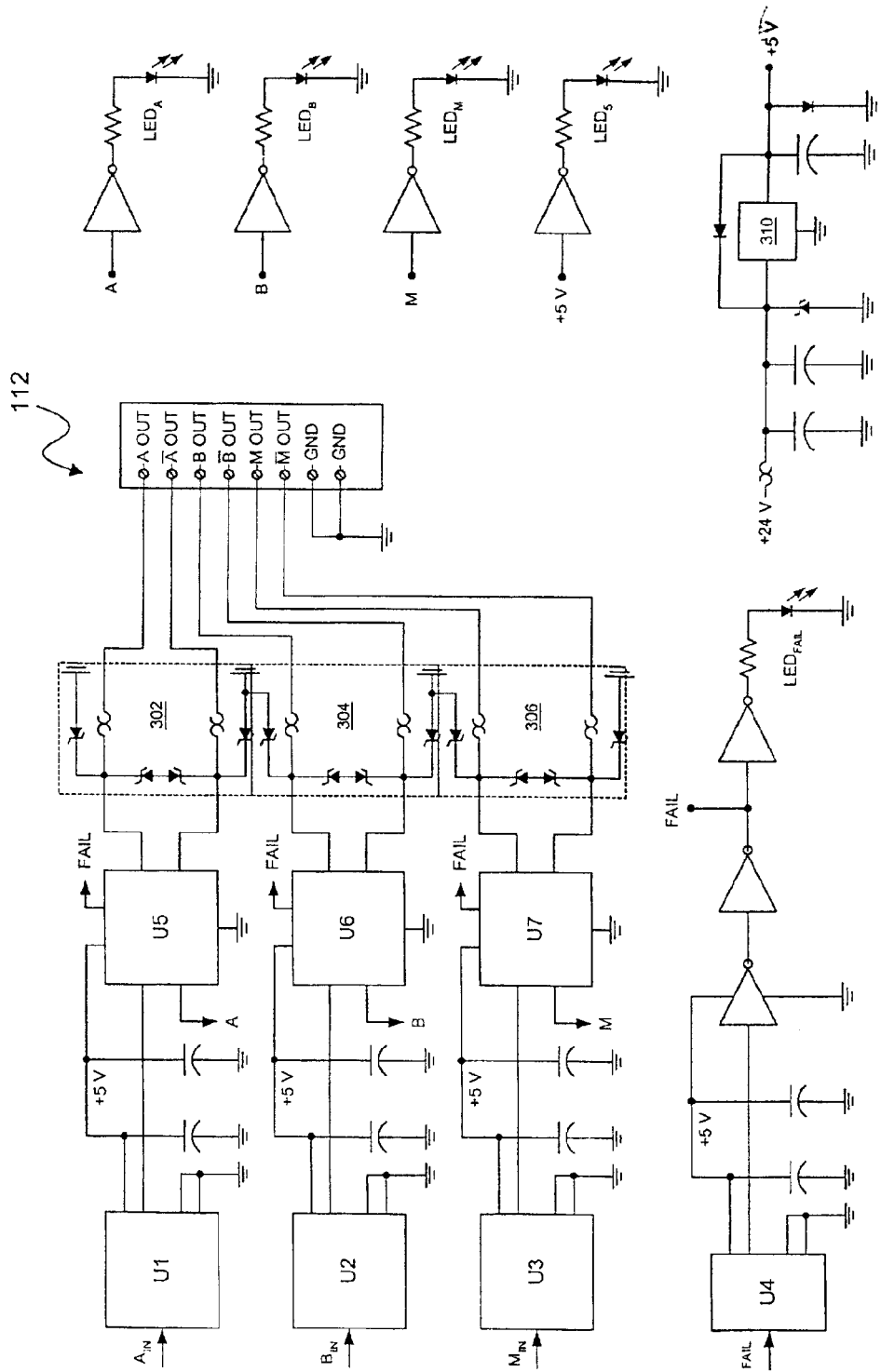
FIG. 3 illustrates an optical-to-electrical converter according to an embodiment of the present invention.

FIG. 3 illustrates the optical-to-electrical converter 112 according to an embodiment of the present invention. The converter 112 includes components that provide reverse functions as that of the electrical-to-optical converter 108. Hence, the components U1, U2, U3, and U4 provide coupling of optical signals A, B, M, and Fail, respectively, from the optical conductors 110. The coupled single-ended optical signals A, B, and M are converted into differential electrical signals by the components U5, U6, and U7, respectively. Transient Over-Voltage protection is provided for these signals by the PTC and Zener diode combination circuits 302, 304, 306. The state of these signals may also be indicated on light-emitting diodes ($LED_A$, $LED_B$, $LED_M$, $LED_{FAIL}$, $LED_S$), as shown in FIG. 3.

A separate supply voltage for the electronic components in the optical-to-electrical converter 112 is provided using a voltage converter 310, and other passive components. Separate supply voltages for the converters 108, 112 are maintained to provide substantial isolation between the encoder 106 and the shaft control system.

Figure 4:
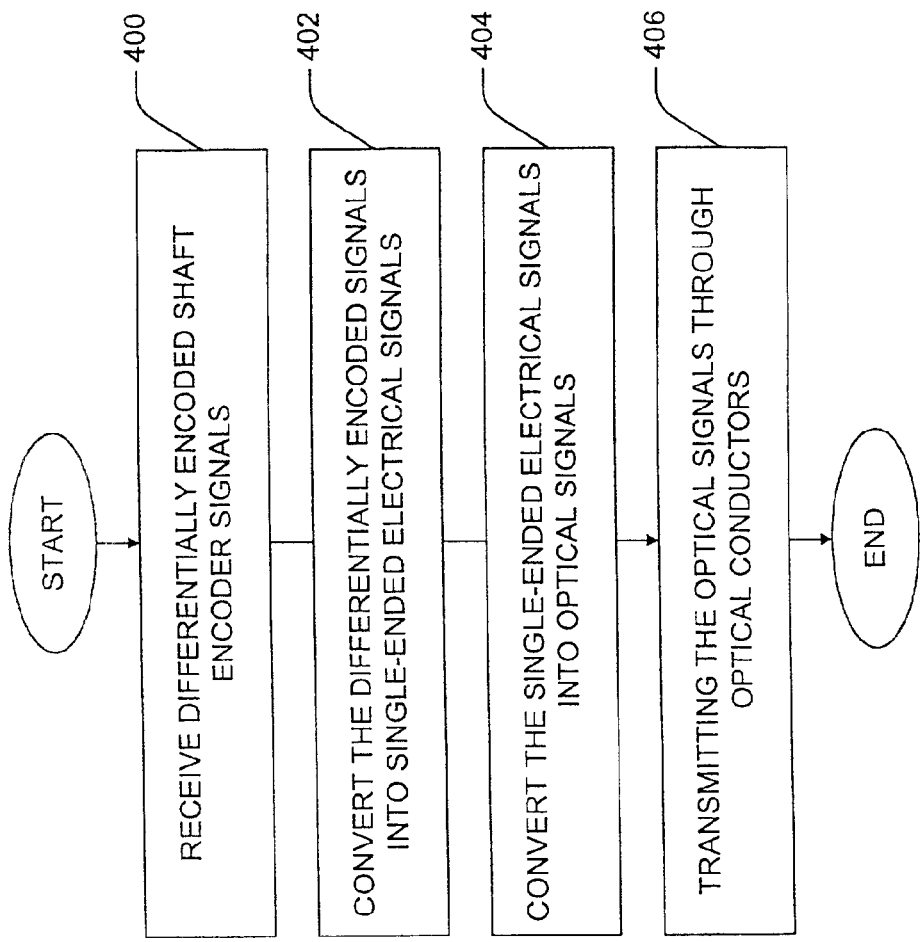
FIG. 4 shows a technique for providing robust and reliable transmission of shaft encoder signals in accordance with an embodiment of the present invention.

FIG. 4 shows a technique for providing robust and reliable transmission of shaft encoder signals in accordance with an embodiment of the present invention. The technique includes receiving differentially encoded shaft encoder signals, at 400. At 402, the differentially encoded signals are converted into single-ended electrical signals. These electrical signals are then converted into optical signals, at 404, and transmitted through optical conductors, at 406. As mentioned above, transmission of encoder signals optically using optical conductors substantially reduces interference from electromagnetic and/or electrical sources.

Illustrated embodiments of the system and technique for reliable transmission of encoder signals used in the incremental shaft encoder system described above in conjunction with FIGS. 1 through 4, present several advantages. These advantages include reduced electromagnetic interference compared to transmission of these signals over copper wires. Advantages also include full galvanic isolation obtained by using separate power supplies for the electrical-to-optical converter 108 and the optical-to-electrical converter 112. The optical transmission technique of the present embodiments also provides substantial reduction of ground loops from controller equipment and shaft encoder. Moreover, the technique improves signal quality by eliminating the long electrical conductors that may result in improper termination of the signal.

There has been disclosed herein embodiments for providing robust and reliable transmission of encoder signals to the shaft control system. The reliable transmission is maintained by a fiber optic shaft encoder system that enables the conversion of electrical encoder signals into optical signals before being transmitted to the shaft control system. This substantially reduces interference from electromagnetic and/or electrical sources.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the embodiments may be practiced without some of these specific details. For example, although the encoder signals are described as being converted into single-ended signals from differential signals before being optically transmitted, the differential signals may be converted directly into optical signals for transmission over the optical conductors. In other instances, well-known structures and functions were not described in elaborate detail in order to avoid obscuring the subject matter of the present invention. Accordingly, the scope and spirit of the invention should be judged in terms of the claims which follow.

What is claimed is:

1. A system, comprising:
   a rotating shaft having shaft movement parameters;
   an incremental shaft encoder coupled to the rotating shaft to convert the shaft movement parameters of the rotating shaft into differentially encoded electrical signals suitable for processing;
   an electrical-to-optical (E/O) converter coupled to the incremental shaft encoder to convert the differentially encoded electrical signals into optical signals;
   a plurality of optical conductors to carry the optical signals; and an optical-to-electrical (O/E) converter to receive the optical signals from the optical conductors and convert the optical signals back into electrical signals, wherein the E/O converter includes:
- a differential-to-single converter to convert the differential encoded electrical signals to single-ended electrical signals; and
- a transient over-voltage protection circuit coupled to the differential-to-single converter, wherein the transient over-voltage protection circuit provides over voltage protection of the differentially encoded electrical signals for the differential-to-single converter.

2. The system of claim 1, wherein said plurality of optical conductors includes fiber optic cables.

3. The system of claim 1, further comprising:
a shaft coupler configured to couple the rotating shaft to the incremental shaft encoder.

4. The system of claim 1, wherein the transient over-voltage protection circuit comprises:
- a voltage level regulator coupled to the transient over-voltage protection circuit to regulate the differentially encoded electrical signals to a voltage level required by the differential-to-single converter;
- a single pole filter coupled to the voltage level regulator to filter noise from the differentially encoded electrical signals; and
- a current limiting circuit coupled to the voltage level regulator to limit an electrical current of the differentially encoded electrical signals.

5. The system of claim 1, wherein the E/O converter further includes a single-ended encoder coupled to the differential-to-single converter to convert the single-ended electrical signals received from the differential-to-single converter to the optical signals to be transmitted to the optical conductors.

6. The system of claim 5, wherein the single-ended encoder includes:
- a plurality of optical couplers to couple the single-ended electrical signals to the optical conductors for transmission; and
- a plurality of driver circuit coupled to the optical couplers respectively for each of the single-ended electrical signals, each of the driver circuit including a transistor having a base, an emitter, and a collector,
wherein the base of the transistor receives the respective single-ended electrical signal and the emitter and the collector of the transistor are coupled to the respective optical coupler to drive the optical coupler.

7. A system, comprising:
a rotating shaft having shaft movement parameters;
an incremental shaft encoder coupled to the rotating shaft to convert the shaft movement parameters of the rotating shaft into differentially encoded electrical signals suitable for processing;
an electrical-to-optical (E/O) converter coupled to the incremental shaft encoder to convert the differentially encoded electrical signals into optical signals;
a plurality of optical conductors to carry the optical signals; and
an optical-to-electrical (O/E) converter to receive the optical signals from the optical conductors and convert the optical signals back into electrical signals,
wherein the O/E converter includes:
- a plurality of optical couplers to receive the optical signals from the optical conductors, and to convert the optical signals to single-ended electrical signals; and
- a single-to-differential converter coupled to the optical couplers to convert the single-ended electrical signals to differentially encoded electrical signals.

8. The system of claim 7, wherein the O/E converter further includes a transient over-voltage protection circuit coupled to the single-to-differential converter to provided over voltage protection for the differentially encoded electrical signals.

9. A method, comprising:
receiving differentially encoded shaft encoder signals representing one or more shaft movement parameters of a rotating shaft;
converting via an electrical-to-optical (E/O) converter the differentially encoded shaft encoder signals into single-ended electrical signals;
converting the single-ended electrical signals into optical signals using the E/O converter, the E/O convert including
- a differential-to-single converter to convert the differentially encoded shaft encoder signals into the single-ended electrical signals, and
- a transient over-voltage protection circuit coupled to the differential-to-single converter, wherein the transient over-voltage protection circuit provides over voltage protection of the differentially encoded electrical signals for the differential-to-single converter; and
transmitting the optical signals through optical conductors.

10. The method of claim 9, further comprising:
coupling shaft movement parameters of a rotating shaft.

11. The method of claim 10, further comprising:
converting the coupled parameters into electrical signals.

12. The method of claim 11, further comprising:
differentially encoding the electrical signals.

13. The method of claim 9, further comprising:
receiving the optical signals from the optical conductors.

14. The method of claim 13, further comprising:
converting the optical signals into single-ended electrical signals.

15. The method of claim 14, further comprising:
differentially encoding the single-ended electrical signals, wherein the receiving, converting, and differentially encoding are performed by an optical-to-electrical (O/E) converter, the O/E converter including
a plurality of optical couplers to receive the optical signals from the optical conductors, and to convert the optical signals to single-ended electrical signals; and
a single-to-differential converter coupled to the optical couplers to convert the single-ended electrical signals to differentially encoded electrical signals.

* * * * *